United States Patent
Siegrist

(10) Patent No.: US 10,783,238 B2
(45) Date of Patent: Sep. 22, 2020

(54) AUTOMATING PASSWORD CHANGE MANAGEMENT

(71) Applicant: LogMeIn, Inc., Boston, MA (US)

(72) Inventor: Joseph Siegrist, Fairfax, VA (US)

(73) Assignee: LogMeIn, Inc., Boston, MA (US)

( * ) Notice: Subject to any disclaimer, the term of this patent is extended or adjusted under 35 U.S.C. 154(b) by 93 days.

(21) Appl. No.: 15/637,391

(22) Filed: Jun. 29, 2017

(65) Prior Publication Data
US 2018/0004935 A1 Jan. 4, 2018

Related U.S. Application Data

(60) Provisional application No. 62/356,948, filed on Jun. 30, 2016.

(51) Int. Cl.
*G06F 21/46* (2013.01)
*H04L 29/06* (2006.01)
*H04W 12/06* (2009.01)
*G06F 21/60* (2013.01)

(52) U.S. Cl.
CPC ............ *G06F 21/46* (2013.01); *H04L 63/083* (2013.01); *H04L 63/0846* (2013.01); *H04W 12/0608* (2019.01); *G06F 21/604* (2013.01); *G06F 2221/2131* (2013.01); *H04L 63/062* (2013.01); *H04L 2463/062* (2013.01)

(58) Field of Classification Search
CPC .. G06F 21/45; G06F 21/46; G06F 2221/2131; H04L 9/08; H04L 9/0863; H04L 29/06782; H04L 29/06795; H04L 63/083; H04L 63/0846
See application file for complete search history.

(56) References Cited

U.S. PATENT DOCUMENTS

| | | | | |
|---|---|---|---|---|
| 8,078,881 B1* | 12/2011 | Liu | ........................ | G06F 21/31 713/183 |
| 9,824,208 B2* | 11/2017 | Cavanagh | ............... | G06F 21/31 |
| 2014/0040456 A1* | 2/2014 | Bingell | .................. | G06Q 10/10 709/224 |
| 2016/0212141 A1* | 7/2016 | Banerjee | ............ | H04L 63/0846 |

* cited by examiner

*Primary Examiner* — Daniel B Potratz
(74) *Attorney, Agent, or Firm* — David H. Judson

(57) ABSTRACT

A password management service provides automated password management. In one embodiment, a method for automating password changes begins in response to a determination that automated password changes are authorized. In response, a data mining session is initiated. Within the data mining session, a set of third party applications or sites are identified. Then, and responsive to receipt of a password reset flow authorization, a password reset flow to one or more of the third party applications or sites is initiated by the service. Thereafter, and still within the data mining session, and for each of the one or more third party applications or sites, a determination is made whether a password reset confirmation link has been received by the service. In response to a determination that a password reset confirmation link has been received for a given third party application or site, the service uses the password reset confirmation link to perform an automated password reset and thereby obtain a new user password for the application or site.

18 Claims, 1 Drawing Sheet

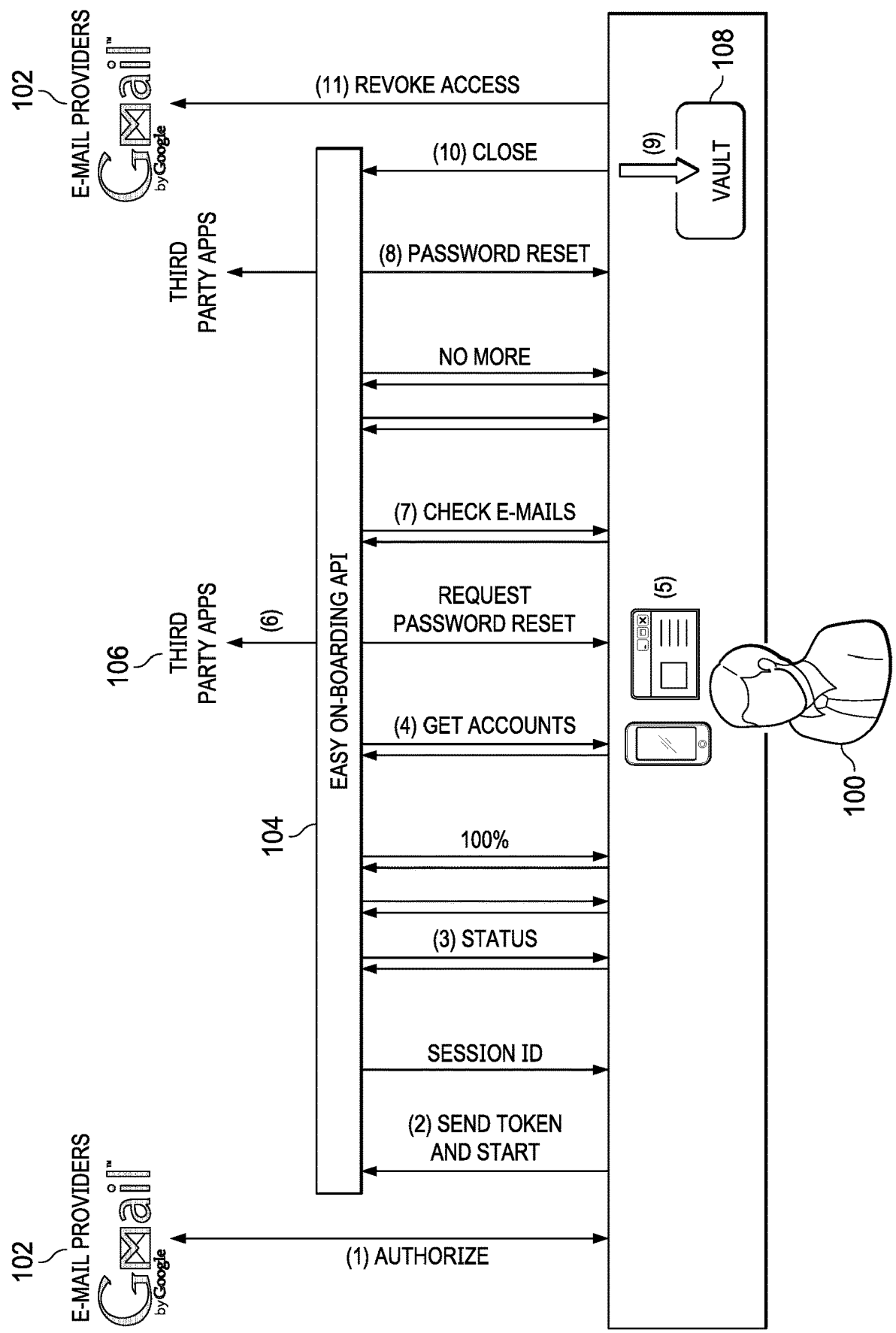

AUTOMATING PASSWORD CHANGE MANAGEMENT

BACKGROUND

Technical Field

This disclosure relates generally to security technologies, products and services.

Background of the Related Art

Password management is a well-developed art. Password management products and services (such as LastPass®) provide Internet users with a single sign-on and access management service by which users can secure their passwords and simplify their online life. To use the service, an end user downloads LastPass and installs a local client on the user's computer or mobile device. Typically, the Last-Pass client runs a browser plug-in (or other add-on). The user then creates an account with the service, typically by providing the user's email address and selecting a strong master password. The user then signs-in to browser extension (or app), and then starts saving and auto-filling passwords for websites and web applications that the user commonly visits. The LastPass service provides a vault where the user can add, view, manage and delete items saved to the service. The user's passwords are stored in the vault as an encrypted blob at the server, and thus the service provider has zero knowledge of the user's actual passwords. The password vault (the encrypted blob) is retrieved to the client and decrypted with the user's master password.

While the service provides significant advantages, on-boarding new users sometimes is time-consuming, especially for mobile-first users that do not want to have to repeatedly enter information required to save the user's passwords. The on-boarding difficulties are exacerbated when the user has a large number of accounts.

BRIEF SUMMARY

A password management service provides automated password management. In one embodiment, a method for automating password changes begins in response to a determination that automated password changes are authorized. In response, a data mining session is initiated. Within the data mining session, a set of third party applications or sites are identified. Then, and responsive to receipt of a password reset flow authorization, a password reset flow to one or more of the third party applications or sites is initiated by the service. Thereafter, and still within the data mining session, and for each of the one or more third party applications or sites, a determination is made whether a password reset confirmation link has been received by the service. In response to a determination that a password reset confirmation link has been received for a given third party application or site, the service uses the password reset confirmation link to perform an automated password reset and thereby obtain a new user password for the application or site. Typically, the set of third party applications or sites are identified from one of: a user e-mail in-box, a browser history, and a list of common or popular third party applications or sites. The technique for automating password changes may be carried out directly by the service, or in association with the user. In the latter case, the password reset itself may be initiated from a user browser plug-in or add-in such that the new user passwords are then collected at the plug-in/add-in.

One application of the above-described technique provides a low-touch method of enabling a user to be on-boarded to the password management service. This technique is sometimes referred to herein as "1-minute" user signup because very little effort is required of a new user beyond downloading the client and creating an account with the service.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 1 depicts the user signup technique of this disclosure.

DETAILED DESCRIPTION OF AN ILLUSTRATIVE EMBODIMENT

Typically, and in one use case as seen in the FIGURE, there are four (4) participants, namely, a client 100 having a web browser (or the like), one or more email providers 102, a service provider having an easy on-boarding application programming interface (API) 104, and a provider site 106 (sometimes referred to herein as a third party "app" or "resource"). The client typically is a laptop or desktop running a web browser, or a comparable mobile device (e.g., iPhone) enabled with a mobile app. An email provider is an entity such as Google Gmail, Yahoo, Office365, or any other IMAP-compliant server. The on-boarding API 104 is a service provider-based functionality that, as will be described, automatically searches the user's e-mail in-box (at a particular email provider 102) for known accounts and password reset URLs. The service provider site 106 provide password management services. A representative (but non-limiting) service provider is LastPass, which stores the user's password management vault encrypted.

The following provides a detailed explanation of a preferred flow for the 1-minute signup service of this disclosure. At step (1), the end user authorizes himself or herself at the email provider and, in return, receives a token with which the API is able to read the user's in-box at the email provider. This operation is repeated for each of the other email providers. (Different email providers may have different authentication requirements; thus, for example, in the Gmail case the user can authorize himself/herself by a simple OAuth flow, whereas with IMAP-based email the user has to pass credentials to each IMAP server). At step (2), the client (e.g., the Last Pass client browser plug-in) starts a session at the service provider API by sending the API one of the received token(s). For each such token, the API responds by queueing a message to a web job, which then starts scanning the user's in-box (at the particular email provider associated with the token) for known accounts. These are the user's accounts that require user credentials for access. Typically, the user will have a large number of accounts, presumably many of which are accessed with different passwords. LastPass provides the user a way to organize those passwords into the password management vault, but as noted that on-boarding process is time-consuming, especially for mobile first-users.

Preferably, the email scanning of the e-mail account is run as a background task, as it may take some time depending on the size of the user's in-box. To this end, the API returns a session ID to the client plug-in, and that session ID is then used by the client to check on the status of the scanning operation. Thus, for example, at step (3), the client begins polling the API for the scanning status. At the end of the scanning process, and at step (4), the API returns to the client a list of the accounts that have been found by the scanning process. Accounts preferably are returned to the client plug-in as they are discovered, although this is not required (they may be provided in batch at the end of the scan). At step (5), this list of accounts is displayed to the user and, in response, he or she can select those items that he or she would like to reset and thus save to the user's password management vault that is protected by the user's master password. At step (6), a password reset request script is then executed, one-by-one, for each of the selections made by the user. (As an alternative, the password reset request script may be executed for all returned accounts unless the user opts-out with respect to one of his or her accounts). At step (7), the client plug-in sends requests to the API to check whether reset URLs (confirmation links) have arrived in the user's email in-box at the email service provider (for each of the selected accounts). The client plug-in is able to do so because the API-email service provider session (represented by the token) is still open. If a confirmation link has been received in the user's in-box, the API retrieves it and passes it to the plug-in. The routine continues at step (8) with the client plug-in follows the confirmation link and executes the password reset script for the particular third party application or site. At step (9), the newly-generated password (for that application or site) is then saved to the password management vault 108. As noted above, this vault is later saved as an encrypted blob at the service provider; it can only be decrypted locally by the user entering his or her master password. At step (10), and after all the password reset(s) have been executed, the service provider API closes the session. At step (11), the API revokes the token and clears it from its cache to complete the process. Once the token is cleared, it cannot be reused, thereby providing the user an assurance that the service provider cannot access the user's in-box for any other purpose.

Thus, according to the technique, and with the user's permission, the service provider API establishes a secure session to an email service provider of the user (or each of them). The API scans the user's in-box at the email service provider and mines the browser history, searching for accounts (or, more generally, prior activities of the user) that the user has accessed previously. These are typically accounts with which the user has an existing credential and that are candidates for an automated password reset flow. As the API identifies the candidates, they are identified to the user. The user then selects which of the identified accounts that are to be subjected to password reset flow. After the user makes this selection, his or her involvement is complete. In response to receipt by the service provider API of a password reset flow authorization from the user (having made a selection in the plug-in (or add-on), an automated password reset flow is initiated. The password reset flow includes delivery of a password reset confirmation link (e.g., "forgotten password? Click here") being sent to the user's email in-box. Because the service provider session (as represented by the token) is still on-going and open, the service provider API sees that password reset confirmation link has arrived.

The service provider provides the link (from the confirmation) to the client browser plug-in (or add-on), which then initiates the reset from the browser (or other add-on). The resulting password is then saved in the user's vault. The same functionality is carried out concurrently for the other accounts and, as a result, the vault is populated.

The above-described scenario is merely representative of one use case. The basic technique may be generalized in many respects, as is now described.

There is no requirement that the technique be implemented by the password management service interacting directly with the end user's browser plug-in or add-on, although that will be a typical implementation. Rather, in the more general case, the password management service may provide the automated user password changes (for which it is responsible) without direct interaction with the user. Thus, for example, provided the automated password changes are authorized (e.g., by the user in advance, or by some other authorization), the password management service may initiate the data mining session(s) (e.g., to the user's email providers) to collect the information identifying accounts of the user associated with third party applications or sites. More generally, it is not even required that the data mining session search for accounts of the user that exist presently; indeed, the approach herein may also be used by the password management service to obtain for the user passwords for one or more third party applications or sites for which the user does not then have an existing account. Further, an end user need not be involved in the process flow, e.g., by providing the password reset flow authorization with respect to a particular third party application or site. Rather, the end user can merely provide a general authorization to the password management service to perform the automatic user password changes. This general authorization may be provided to the management service when the user registers for the service, thereafter upon the user's specified request, or in response to a user authorization following some particular event or occurrence (e.g., receipt of a notification that the third party application or site has been subjected to a potential compromise).

Thus, according to a more generalized scheme of this disclosure, a password management service provides automated password management. In one embodiment, a method for automating password changes begins in response to a determination that automated password changes are authorized. In response, a data mining session is initiated. Within the data mining session, a set of third party applications or sites are identified. Then, and responsive to receipt of a password reset flow authorization, a password reset flow to one or more of the third party applications or sites is initiated by the service. Thereafter, and still within the data mining session, and for each of the one or more third party applications or sites, a determination is made whether a password reset confirmation link has been received by the service. In response to a determination that a password reset confirmation link has been received for a given third party application or site, the service uses the password reset confirmation link to perform an automated password reset and thereby obtain a new user password for the application or site. Typically, the set of third party applications or sites are identified from one of: a user e-mail in-box, a browser history, and a list of common or popular third party applications or sites. The technique for automating password changes may be carried out directly by the service, or in association with the user. In the latter case, the password reset itself may be initiated from a user browser plug-in or add-in such that the new user passwords are then collected at the plug-in/add-in.

A password "change" as provided for herein typically involves change of an existing user password to a new user password, but this is not a limitation. A password "change" may also refer to the instantiation of a user password in the first instance, e.g., with respect to a third party application or site that the user does not then have a password. A password "change" may also refer to the creation of a user password at a time following expiration of a prior password. Typically, the password management service is provided by a cloud service provider, such as LogMeIn LastPass. The cloud service provider provides the password management described herein as a cloud service, together with the browser plug-in (which, for example, the user may obtain by way of a download). A user registers with the service to obtain the described automated password change management service, and the service typically provides the user with various service configuration options (e.g., how often to change passwords, the source(s) of the data mining, and so forth).

As another use case, the technique herein may even be used as a generic login mechanism, wherein a user uses the password reset flow every time to login. In particular, there are users that (for various reasons) go through the password reset flow every time they login, and the approach herein may be used to essentially automate that flow. Thus, every time the user goes to login, a password reset is done, the email collected, and a new random password is used to log the user in. In this variant, storage of the changed password is then unnecessary, and thus this approach may have value to such users, as the system would never store their passwords.

Generalizing, the cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Other Enabling Technologies

Representative client entities include laptops, desktops, workstations, other mobile devices or machines associated with such other mobile devices, and the like. The service provider is a password management service such as LastPass® that has been augmented with the functions described.

The cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The computing entity on which the browser and its associated browser plug-in run may be any network-accessible computing entity that is other than the mobile device that runs the authenticator app itself. Representative entities includes laptops, desktops, workstations, other mobile devices or machines associated with such other mobile devices, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The techniques herein provide for improvements to technology or technical field, namely, cloud-based access control, as well as improvements to various technologies such as password management mechanisms, all as described.

Having described my invention, what I claim is as follows:

1. A method to automate password changes in a password management service, comprising:

responsive to receipt of a token, the token representing a session between a user having an e-mail account and an e-mail service provider that provides the user that e-mail account, the token having been generated by the e-mail service provider, the password management service initiating a data mining session directed to identifying prior activities of the user with respect to third party applications or sites;

within the data mining session and while the session as represented by the token remains active, the password management service:

identifying a set of such third party applications or sites by mining the user's e-mail account;

responsive to receipt of a password reset flow authorization, automatically initiating a password reset flow to one or more of the third party applications or sites mined from the user's e-mail account;

for each of the one or more third party applications or sites mined from the user's e-mail account, determining whether a password reset confirmation link has been received;

responsive to a determination that a password reset confirmation link has been received for a given third party application or site, using the password reset confirmation link to perform an automated password reset and thereby obtain a new user password; and receiving an indication that the token is revoked such that further access to the user's e-mail account by the password management service is prevented.

2. The method as described in claim 1 wherein the password reset confirmation link is provided to a browser plug-in or add-on to facilitate the automated password reset from the browser plug-in or add-on.

3. The method as described in claim 1 further including storing the new user passwords in a password management vault associated with the user.

4. The method as described in claim 3 further including storing the password management vault as an encrypted blob at the password management service.

5. The method as described in claim 1 further including:
exposing at least one third party application or site to a user as a potential candidate for password reset; and
receiving the password reset flow authorization from the user.

6. The method as described in claim 5 further including closing the data mining session upon completing of the automated password reset for each of the third party application or sites for which the user has provided a password reset flow authorization.

7. The method as described in claim 5 wherein the third party application or site is exposed to the user as it is discovered during the data mining session.

8. The method as described in claim 1 wherein the user is a mobile device user.

9. Apparatus, comprising:
a hardware processor;
computer memory holding computer program instructions to provide automated password management as a password management service, the computer program instructions configured:
in response to receipt of a token, the token representing a session between a user having an e-mail account and an e-mail service provider that provides the user that e-mail account, the token having been generated by the e-mail service provider, to initiate a data mining session directed to identifying prior activities of the user with respect to third party applications or sites;
within the data mining session and while the session as represented by the token remains active:
to identify a set of such third party applications or sites by mining the user's e-mail account;
in response to receipt of a password reset flow authorization, to initiate a password reset flow to one or more of the third party applications or sites mined from the user's e-mail account;

for each of the one or more third party applications or sites mined from the user's e-mail account, to determine whether a password reset confirmation link has been received;

in response to a determination that a password reset confirmation link has been received for a given third party application or site, to obtain a new user password for the application or site using the password reset confirmation link to perform an automated password reset; and receive an indication that the token is revoked such that further access to the user's e-mail account by the password management service is prevented.

10. The apparatus as described in claim 9 wherein the computer program instructions are further operative to provide the password reset confirmation link to a browser plug-in or add-on to facilitate the automated password reset from the browser plug-in or add-on.

11. The apparatus as described in claim 9 wherein the computer program instructions are further operative to store the new user passwords in a password management vault associated with the user.

12. The apparatus as described in claim 11 wherein the computer program instructions are operative to store the password management vault as an encrypted blob.

13. The method as described in claim 9 wherein the computer program instructions are further operative to:
expose at least one third party application or site to a user as a potential candidate for password reset; and
receive the password reset flow authorization from the user.

14. The apparatus as described in claim 13 wherein the computer program instructions are further operative to close the data mining session upon completing of the automated password reset for each of the third party application or sites for which the user has provided a password reset flow authorization.

15. The apparatus as described in claim 13 wherein the third party application or site is exposed to the user as it is discovered during the data mining session.

16. Software-as-a-service system for password change management, comprising:
a network-accessible cloud service executing in a hardware element and having a data repository associated therewith, the cloud service providing a password management service; and
a browser plug-in or add-in configured to be executed in an end user computing system distinct from the network-accessible cloud service;
the network-accessible cloud service operative in response to receipt of a token, the token representing a session between a user having an e-mail account and an e-mail service provider that provides the user that e-mail account, the token having been generated by the e-mail service provider, to initiate a data mining session directed to identifying prior activities of the user with respect to third party applications or sites, wherein during the data mining session and while the session as represented by the token remains active, the network-accessible cloud service is configured to:
identify a set of such third party applications or sites by mining the user's e-mail account;
in response to receipt of a password receipt flow authorization, initiate a password reset flow to one or more of the third party applications or sites mined from the user's e-mail account;

for each of the one or more third party applications or sites mined from the user's e-mail account, determine whether a password reset confirmation link has been received; and in response to a determination that a password reset confirmation link has been received for a given third party application or site, provide the password reset confirmation link to the browser plug-in or add-in; and the network-accessible cloud service being further configured receive an indication that the token is revoked, thereby restricting further access by the password management service to the user's e-mail account.

17. The system as described in claim 16 wherein the browser plug-in or add-in uses the password reset confirmation link to obtain a new user password for the application or site.

18. The system as described in claim 16 wherein the data repository stores passwords of a user, the passwords being stored as an encrypted blob.

* * * * *